United States Patent
Railton et al.

(10) Patent No.: US 12,553,642 B2
(45) Date of Patent: Feb. 17, 2026

(54) FAN ASSEMBLY

(71) Applicant: Dyson Technology Limited, Malmesbury (GB)

(72) Inventors: Samuel Thomas Railton, Bristol (GB); Matthew Jerome Jennings, Cheltenham (GB); Robert James Kyle, Bristol (GB); Matthew Graham Legg, Swindon (GB); Andrea Ricci, Bristol (GB)

(73) Assignee: Dyson Technology Limited, hire (GB)

( * ) Notice: Subject to any disclaimer, the term of this patent is extended or adjusted under 35 U.S.C. 154(b) by 0 days.

(21) Appl. No.: 18/720,711

(22) PCT Filed: Dec. 12, 2022

(86) PCT No.: PCT/GB2022/053176
§ 371 (c)(1),
(2) Date: Jun. 17, 2024

(87) PCT Pub. No.: WO2023/111530
PCT Pub. Date: Jun. 22, 2023

(65) Prior Publication Data
US 2025/0052447 A1    Feb. 13, 2025

(30) Foreign Application Priority Data
Dec. 17, 2021 (GB) .................................. 2118380

(51) Int. Cl.
*F24F 13/22*  (2006.01)
*F04D 17/06*  (2006.01)
(Continued)

(52) U.S. Cl.
CPC ............ *F24F 13/222* (2013.01); *F04D 17/06* (2013.01); *F04D 29/4226* (2013.01);
(Continued)

(58) Field of Classification Search
CPC .... F24F 1/01; F24F 1/0358; F24F 1/02; F24F 1/022; F24F 1/0287; F24F 1/029;
(Continued)

(56) References Cited

U.S. PATENT DOCUMENTS 2,638,757 A    5/1953    Borgerd
3,524,328 A *  8/1970    Schuster ................. F24F 1/035
                                                         165/122
(Continued)

FOREIGN PATENT DOCUMENTS

CN    201463264 U    5/2010
CN    201926082 U    8/2011
(Continued)

*Primary Examiner* — Courtney D Heinle
*Assistant Examiner* — Jesse M Prager
(74) *Attorney, Agent, or Firm* — Tucker Ellis LLP

(57) ABSTRACT

A fan assembly is described comprising a refrigeration system, an airflow generator and a condensation collector. The refrigeration system comprises a first heat exchanger and a second heat exchanger. The airflow generator is for generating an airflow over the second heat exchanger, and the condensation collector is for collecting condensate that forms on the second heat exchanger.

19 Claims, 5 Drawing Sheets

(51) Int. Cl.

| | |
|---|---|
| *F04D 29/42* | (2006.01) |
| *F04D 29/70* | (2006.01) |
| *F24F 1/02* | (2019.01) |
| *F24F 1/022* | (2019.01) |
| *F24F 1/0287* | (2019.01) |
| *F24F 1/029* | (2019.01) |
| *F24F 1/0323* | (2019.01) |
| *F24F 1/035* | (2019.01) |
| *F24F 1/0358* | (2019.01) |
| *F24F 3/14* | (2006.01) |
| *F24F 5/00* | (2006.01) |
| *F24F 8/108* | (2021.01) |

(52) U.S. Cl.
CPC ............ *F04D 29/706* (2013.01); *F24F 1/02* (2013.01); *F24F 1/022* (2013.01); *F24F 1/0287* (2019.02); *F24F 1/029* (2019.02); *F24F 1/0323* (2019.02); *F24F 1/035* (2019.02); *F24F 1/0358* (2019.02); *F24F 3/1405* (2013.01); *F24F 8/108* (2021.01); *F24F 5/0021* (2013.01)

(58) Field of Classification Search
CPC .. F24F 1/0323; F24F 1/035; F24F 1/04; F24F 3/1405; F24F 5/001; F24F 5/0021; F24F 8/108; F24F 13/222; F04D 29/4226; F04D 29/5926; F04D 29/706; F04D 17/06
See application file for complete search history.

(56) References Cited

U.S. PATENT DOCUMENTS

| | | | |
|---|---|---|---|
| 10,401,041 B2 * | 9/2019 | Martinez Galvan | .... F24F 1/022 |
| 2015/0192334 A1 | 7/2015 | Hancock | |
| 2019/0137121 A1 * | 5/2019 | Swanson | ................. F24F 1/028 |

FOREIGN PATENT DOCUMENTS

| | | | | |
|---|---|---|---|---|
| CN | 202734200 U | | 2/2013 | |
| CN | 211600968 U | | 9/2020 | |
| DE | 39 38 875 A1 | | 5/1991 | |
| EP | 2 428 751 A2 | | 3/2012 | |
| EP | 2 623 912 A1 | | 8/2013 | |
| EP | 2 884 205 A1 | | 6/2015 | |
| EP | 3153782 A1 * | | 4/2017 | ............... F24F 1/00 |
| EP | 3 473 940 A1 | | 4/2019 | |
| GB | 1457386 A | | 12/1976 | |
| GB | 2526094 A | | 11/2015 | |
| JP | S59-71937 A | | 4/1984 | |
| JP | S59-225234 A | | 12/1984 | |
| JP | 2004-309053 A | | 11/2004 | |
| JP | 2010-043765 A | | 2/2010 | |
| JP | 2013-238380 A | | 11/2013 | |
| JP | 2020-133923 A | | 8/2020 | |
| KR | 2004 0078403 A * | | 9/2004 | |
| KR | 2008 0027491 A * | | 3/2008 | |
| WO | 03/046440 A1 | | 6/2003 | |
| WO | 2006/098436 A1 | | 9/2006 | |
| WO | 2009/026618 A1 | | 3/2009 | |
| WO | WO-2017137327 A1 * | | 8/2017 | |
| WO | 2017/165924 A1 | | 10/2017 | |
| WO | 2019/160153 A1 | | 8/2019 | |
| WO | 2020/141303 A2 | | 7/2020 | |
| WO | WO-2020141302 A1 * | | 7/2020 | ................ C02F 1/32 |

* cited by examiner

FAN ASSEMBLY

RELATED APPLICATION DATA

This application is a national phase application of International Application No. PCT/GB2022/053176 filed Dec. 12, 2022, which claims priority to GB Application 2118380.0 filed Dec. 17, 2021.

FIELD OF THE INVENTION

The present invention relates to a fan assembly.

BACKGROUND OF THE INVENTION

Some fan assemblies may utilise a refrigeration system to provide a cooled airflow. The refrigeration system may employ a pair of heat exchangers to remove heat from the airflow at one of the heat exchangers, and reject the heat at the other of the heat exchangers.

SUMMARY OF THE INVENTION

The present invention provides a fan assembly comprising a refrigeration system comprising a first heat exchanger and a second heat exchanger, the second heat exchanger being located above the first heat exchanger, an airflow generator for generating an airflow over the second heat exchanger, and a condensation collector for collecting condensate that forms on the second heat exchanger, wherein the condensation collector comprises a tray located between the first heat exchanger and the second heat exchanger. As a result, condensate formed on the second heat exchanger during use is collected and thereby may be prevented from damaging other components of the fan assembly. Additionally, this may enable the collected condensate to be disposed of (e.g., by removing and emptying the tray) and thereby may reduce the generation of bacteria and malodour. Locating the tray between the two heat exchangers makes better use of the available space within the fan assembly and thereby may provide a more compact arrangement. By stacking the heat exchangers above one another, the footprint of the fan assembly may be reduced. This may increase the utility of the fan assembly by making it more easily accommodated within a domestic setting.

The tray may be removable from the fan assembly. The tray may therefore be removed and emptied to remove collected condensate from the fan assembly. As a result, condensate can be collected and removed from the fan assembly without requiring the fan assembly to be connected to an external drain. The fan assembly may therefore be self-contained, and thereby the portability of the fan assembly may be improved. Additionally, moving the whole fan assembly to remove condensate is not required. As the fan assembly may be relatively heavy, this may improve the usability of the fan assembly. Furthermore, the tray can be removed for cleaning. This may aid the prevention of bacteria and malodour build up within the fan assembly.

The condensation collector may further comprise a bottle, and the tray may comprise a drain through which condensate collected by the tray drains into the bottle. Providing a bottle for the collection of condensate may enable a higher quantity of condensate to be collected.

The tray and the bottle may each be removable from the fan assembly. As discussed previously, the tray and the bottle may therefore be removed and emptied to remove collected condensate from the fan assembly. The fan assembly may therefore be self-contained, and thereby the portability of the fan assembly may be improved. Additionally, moving the whole fan assembly to remove condensate is not required. As the fan assembly may be relatively heavy, this may improve the usability of the fan assembly. Furthermore, the tray and the bottle can be removed for cleaning. This may aid the prevention of bacteria and malodour build up within the fan assembly.

The first heat exchanger may be annular in shape and comprise a gap within which the bottle may be located. Locating the bottle within a gap in the first heat exchanger may provide a compact arrangement. Additionally, the bottle may be located lower down in the fan assembly such that the weight of the collected condensate does not adversely affect the stability of the fan assembly, and may indeed improve the stability. By having an annular shape, the footprint of the fan assembly may be reduced whilst achieving a good area for the first heat exchanger.

The second heat exchanger may be annular in shape. As a result, other components of the fan assembly (such as the airflow generator) may be located within the void inside of the second heat exchanger to make better use of the available space and improve the compactness of the fan assembly. The tray may have a circular shape. As a result, the volume of condensate storable for a given tray height may be increased. Thereby, the height of the tray may be reduced, which may provide a compact arrangement and reduce the height of the fan assembly.

The fan assembly may comprise a filter assembly for filtering the airflow, and the filter assembly may surround the second heat exchanger. The filter assembly therefore presents a restriction to the airflow that moves over the second heat exchanger. As a result, the airflow may be more uniformly distributed over the second heat exchanger. This may have two benefits. Firstly, the performance of the second heat exchanger may be improved. Secondly, improving the uniformity of the airflow over the second heat exchanger may reduce the amount of condensate that forms on the second heat exchanger. Thereby, by surrounding the second heat exchanger with the filter assembly, a smaller condensation collector may be employed, thereby resulting in a more compact fan assembly. Additionally, this may provide a compact and cost-effective arrangement as the filter assembly may be used for dual purposes: providing a restriction to improve the performance of the second heat exchanger and filtering the airflow. The filter assembly may comprise a HEPA filter. As a result, a cleaner airflow may be provided to a user. Additionally, the amount of bacterial growth within the fan assembly may be reduced, which may make the fan assembly easier to maintain due to a reduction in the frequency that cleaning is required.

The fan assembly may comprise a main body, and the filter assembly may comprise a seal for sealing the filter assembly against the main body. Additionally, the tray may be located downstream of the seal, and may be removable from the main body by first removing at least a part of the filter assembly from the main body. As a result, the tray does not act as a leak path through which the airflow may bypass the filter assembly. This may result in several advantages. Firstly, the purity of the airflow emitted from the fan assembly may be improved. Secondly, the tray need not require its own seal to prevent airflow bypassing the filter assembly. Thereby, the fan assembly may be more robust (due to having fewer seals which may fail) and cheaper to produce.

The fan assembly may comprise a main body, and the filter assembly may comprise a first seal for sealing the filter assembly against the main body. Additionally, the tray may comprise a second seal for sealing the tray against the main body, and may be removable from the main body independently of the filter assembly. The tray may require removing and emptying relatively frequently (e.g., after each use), whilst the filter assembly may require removing and cleaning/replacement less frequently. Therefore, by providing an independently removable tray, the user is not required to unnecessarily remove the filter assembly to remove the tray. This may improve the ease of use of the fan assembly. The provision of the second seal may reduce the amount of airflow that can bypass the filter assembly via the tray, thereby improving the purity of the airflow emitted by the fan assembly.

The condensation collector may have a capacity of greater than 200 mL. This may improve the usability of the fan assembly, as the condensation collector may be emptied relatively infrequently. Indeed, the size of the condensation collector may be sufficiently large to collect all condensation generated in a full day of use of the fan assembly.

The second heat exchanger may surround a major portion of the airflow generator. Thereby, the airflow generator is nested within the second heat exchanger, which may provide a compact arrangement and reduce the height of the fan assembly. Additionally, nesting the airflow generator centrally within the second heat exchanger may improve the uniformity of the airflow over the second heat exchanger and thereby the performance of the second heat exchanger.

The fan assembly may comprise a thermal store, and the first heat exchanger may be configured to exchange heat with the thermal store. Thereby the thermal store may store heat transferred from the first heat exchanger and thereby obviate the requirement to expel the heat immediately into the surrounding environment. For example, the fan assembly may cool the air within a room, with the extracted heat being stored in the thermal store. The heat stored by the thermal store may then be expelled at a later time when cooling is not required. For example, the fan assembly may provide cooling during the day or when the room is occupied, and expel the heat stored in the thermal store overnight or when the room is unoccupied. Additionally, employing a thermal store obviates the requirement for an additional airflow over the first heat exchanger. Thereby, the fan assembly may be simplified, which may result in a more compact and/or quieter arrangement. Moreover, if the refrigeration system is configured to be operable in reverse, i.e. heat the airflow at the second heat exchanger and cool a medium at the first heat exchanger, removing the additional airflow results in the obviation of a requirement for an additional tray located beneath the first heat exchanger to collect condensation generated on the first heat exchanger. This may provide a simplified and more compact fan assembly.

The first heat exchanger and second heat exchanger may be cylindrical in shape. By being cylindrical in shape, the heat exchangers may be located around other components of the fan assembly (e.g., the compressor or the airflow generator) to provide a relatively compact arrangement.

The refrigeration system may comprise a compressor, and the first heat exchanger may surround a major portion of the compressor. As a result, a relatively compact arrangement may be achieved.

The fan assembly may comprise a compressor for moving a refrigerant between the first heat exchanger and the second heat exchanger, and a metering device for reducing a pressure of the refrigerant. By comprising a metering device, the refrigeration system is able to operate a refrigeration cycle in which heat is transferred from the airflow to a hotter medium located at the first heat exchanger (e.g., a thermal store). For example, heat may be transferred from the refrigerant to the medium at the first heat exchanger. The pressure and temperature of the refrigerant may then be reduced by the metering device, and heat may be transferred to the refrigerant from the airflow at the second heat exchanger. Finally, the pressure and temperature of the refrigerant may be increased by the compressor, and heat may again be transferred from the refrigerant to the medium at the first heat exchanger. By transferring heat to a hotter medium, cooling of the airflow may be achieved without the need for a medium at a lower temperature than the airflow.

The present invention also provides a fan assembly comprising: a refrigeration system comprising a first heat exchanger and a second heat exchanger; an airflow generator for generating an airflow over the second heat exchanger; and a condensation collector for collecting condensate that forms on the second heat exchanger, wherein the condensation collector comprises a bottle, and the first heat exchanger is annular in shape and comprises a gap within which the bottle is located. As a result, condensate formed on the second heat exchanger during use is collected and thereby may be prevented from damaging other components of the fan assembly. The first heat exchanger is annular shape and therefore the size or footprint of the fan assembly may be reduced whilst achieving a good area for the first heat exchanger. Furthermore, by locating the bottle within a gap in the first heat exchanger, a more compact arrangement may be achieved.

The bottle may be removable from the fan assembly. The collected condensate may therefore be disposed of without requiring the fan assembly to be connected to an external drain. The fan assembly may therefore be self-contained, and thereby the portability of the fan assembly may be improved. Additionally, it is not necessary to move the fan assembly, which may be relatively heavy, to dispose of the condensate. Furthermore, the bottle can be removed for cleaning. This may aid the prevention of bacteria and malodour building up within the fan assembly.

The second heat exchanger may be located above the first heat exchanger. By stacking the heat exchangers above one another, the footprint of the fan assembly may be reduced. This may increase the utility of the fan assembly by making it more easily accommodated within a domestic setting. Additionally, as the bottle is located within the gap in the first heat exchanger, the bottle may be located lower down in the fan assembly such that the weight of the collected condensate does not adversely affect the stability of the fan assembly, and may indeed improve the stability.

The condensation collector may further comprise a tray located beneath the second heat exchanger, and the tray may comprise a drain through which condensate collected by the tray drains into the bottle. As a result, condensate may be collected by the tray and then guided to the bottle irrespective of the size and/or shape of the second heat exchanger. Accordingly, a second heat exchanger having a relatively large area may be employed and yet condensate may nevertheless be guided to and collected in the bottle.

The tray and the bottle may each be removable from the fan assembly. As discussed previously, condensate may then be removed from the fan assembly in a convenient way. Furthermore, the tray and the bottle can be removed for cleaning, which may aid the prevention of bacteria and malodour building up within the fan assembly.

DETAILED DESCRIPTION OF THE INVENTION

The fan assembly 10 of FIGS. 1 to 4 comprises a nozzle 11 and a main body 15.

Figure 1:
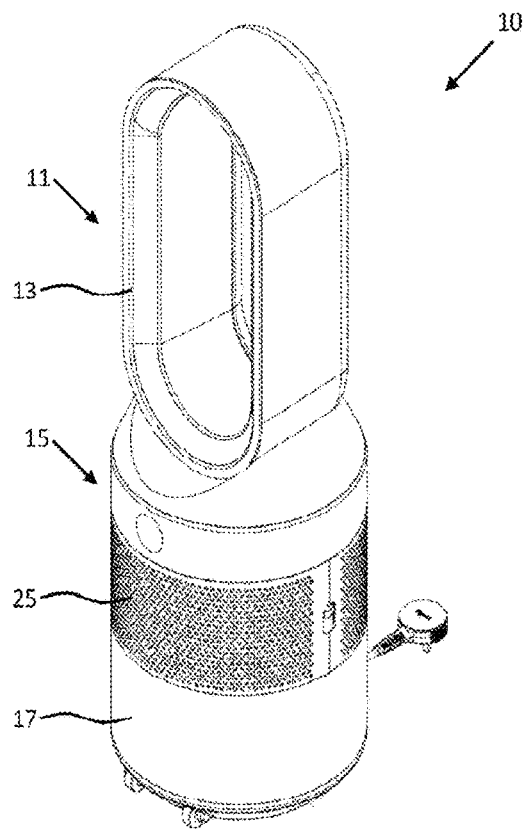
FIG. 1 is a front perspective view of a fan assembly.
Figure 2:
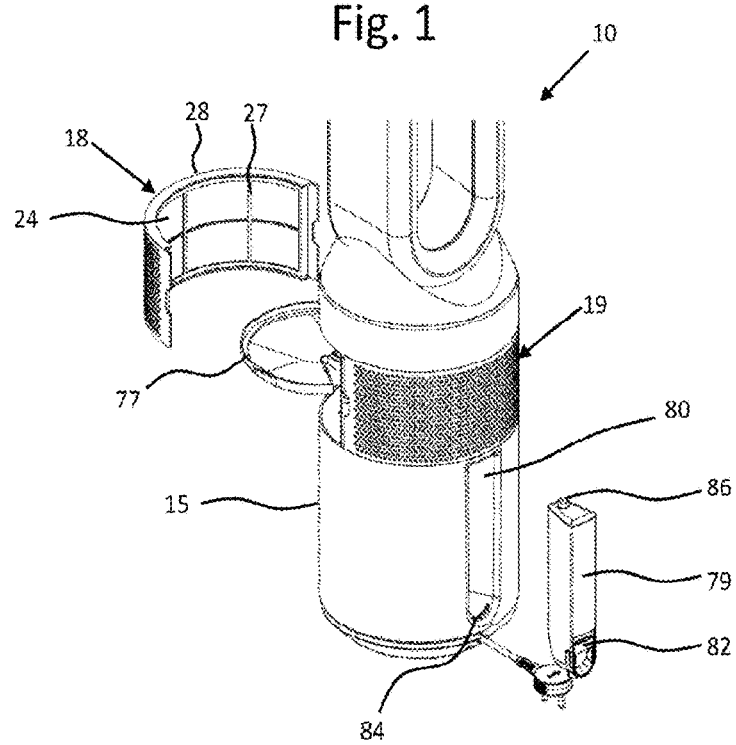
FIG. 2 is a rear perspective view of the fan assembly with the components of the fan assembly removed.
Figure 3:
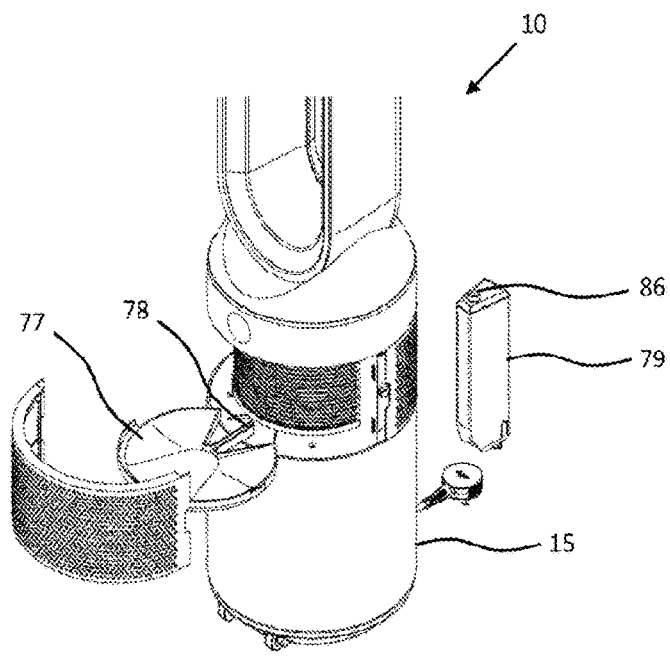
FIG. 3 is a front perspective view of the fan assembly with components of the fan assembly removed.

The nozzle 11 is attached to the main body 15 and comprises an inlet 12 for receiving an airflow from the main body, and an outlet 13 for emitting the airflow. In the example of FIG. 1, the nozzle 11 is generally racetrack shaped, the inlet 12 comprises an opening in a base of the nozzle 11, and the outlet 13 comprises a pair of slots that each extend along straight portions of the nozzle 11. In some examples, the nozzle 11 may comprise slats, louvres or other means for changing the direction of the airflow emitted from the outlet 13. Thereby, the direction of the airflow may be changed without the need to rotate the nozzle 11 or main body 15.

The main body 15 comprises a housing 17, a pair of filter assemblies 18,19, an airflow generator 20, a refrigeration system 21, a condensation collector 77,79, and a control unit 23.

The housing 17 houses the filter assemblies 18,19, the airflow generator 20, the refrigeration system 21, the condensation collector 77,79, and the control unit 23. The housing 17 comprises an inlet 25 through which an airflow is drawn into the main body 15, and an outlet 26 through which the airflow is emitted into the nozzle 11. In the illustrated example, the housing 17 is cylindrical in shape, the inlet 25 comprises a plurality of apertures in a side wall of the housing 17, and the outlet 26 comprises an opening in a top wall of the housing 17.

Each of the filter assemblies 18,19 comprises a filter medium 24 supported by a frame 27, and a seal 28 provided around the perimeter of the frame 27. Each of the filter assemblies 18,19 is removably attached to a section of the housing 17, which in turn is removable from the main body 15. As a result, the sections of the housing may be removed, and the filter assemblies 18,19 removed from the sections for cleaning and/or replacement.

Each of the filter assemblies 18,19 is arcuate and subtends a central angle of roughly 180°. The filter assemblies 18,19 surround a heat exchanger 49 of the refrigeration system 21 (described below in more detail) and the airflow generator 20.

In this example, the filter medium 24 is a HEPA filter medium that removes particulates, such as pollutants and bacteria, from the airflow. However, other or additional filter media could be employed, such as an activated carbon filter medium for removing undesirable gases, such as volatile organic compounds, from the airflow.

The seal 28 of each filter assembly 18,19 seals against the main body 15 and reduces potential leak paths, in which air is drawn into the main body 15 but bypasses the filter assemblies 18,19. Thereby the purity of the airflow emitted from the fan assembly 10 may be improved.

The airflow generator 20 comprises an impeller driven by an electric motor. The airflow generator 20 generates an airflow between the inlet 25 of the housing 17 and the outlet 26 of the main body 15. More particularly, the airflow is drawn into the housing 17 via the inlet 25 of the housing 17, whereupon the airflow is drawn through the filter assemblies 18,19 to remove particulates from the airflow. The airflow is then drawn over the heat exchanger 49 of the refrigeration system 21 to condition the airflow. The conditioned airflow then moves through the airflow generator 20, and is emitted from the main body 15 via the outlet 26.

By locating the filter assemblies 18,19 upstream of the heat exchanger 49, the filter assemblies 18,19 presents a restriction to the airflow that moves over the heat exchanger 49. As a result, the airflow may be more uniformly distributed over the heat exchanger 49, thereby improving the performance of the heat exchanger 49.

The refrigeration system 21, which is described below in more detail, is operable in one of two states to condition the airflow. In a first operating state, the refrigeration system 21 cools the airflow, and in a second operating state, the refrigeration system 21 warms the airflow.

The condensation collector 77,79 collects condensate that forms on the heat exchanger 49 and comprises a tray 77 and a bottle 79. The tray 77 is located beneath the heat exchanger 49 and acts to collect condensate that falls from the heat exchanger 49. The tray 77 has a sloped upper surface that guides the collected condensate to a drain 78 in the tray 77. The bottle 79 is located directly beneath the drain 78 such that condensate collected by the tray 77 drains into the bottle 79 via the drain 78.

In this example, the tray 77 has a generally circular shape with a pair of triangular holes for allowing components of the refrigeration system to pass through the tray 77.

The tray 77 and the bottle 79 are each removable from the fan assembly 10, e.g. in radial directions. The tray 77 and the bottle 79 may therefore be removed and emptied to remove collected condensate from the fan assembly 10. As a result, condensate can be collected and removed from the fan assembly 10 without requiring the fan assembly 10 to be connected to an external drain. The fan assembly 10 may therefore be self-contained, and thereby the portability of the fan assembly 10 may be improved. Additionally, moving the whole fan assembly 10 to remove condensate is not required. As the fan assembly 10 may be relatively heavy, this may improve the usability of the fan assembly 10. Furthermore, the tray 77 and the bottle 79 can be removed for cleaning, which may prevent of bacteria and malodour build up within the fan assembly 10.

The tray 77 is received within a slot in the main body 15 that is located inwardly of the filter assemblies 18,19. Accordingly, in order to remove the tray 77, the user must first remove one of the filter assemblies 18,19. The tray 77 is therefore located downstream of the seal 28 of the filter assembly 18 and thus does not present a leak path through which the airflow may bypass the filter assemblies 18,19.

The bottle 79 is received within a recess 80 in the main body 15. To facilitate the removal of the bottle 79, the bottle 79 comprises a slidable locking portion 82 which engages a slot 84 in the housing 17. To detach and attach the bottle 79, the user slides the locking portion 82 into and out of the slot 84. The bottle also comprises a spout 86 which engages with the drain 78 of the tray 77.

In this example, the condensation collector 77,79 has a capacity of 400 mL. Specifically, the tray 77 has a capacity of 100 ml and the bottle 79 has a capacity of 300 mL. This may improve the usability of the fan assembly 10, as the condensation collector 77,79 may be emptied relatively infrequently. Indeed, the size of the condensation collector 77,79 may be sufficiently large to collect all condensation generated in a full day of use of the fan assembly 10. Equally, the condensation collector 77,79 may have a capacity of greater than 200 mL and realise the above benefit of relatively infrequent emptying.

Figure 4:
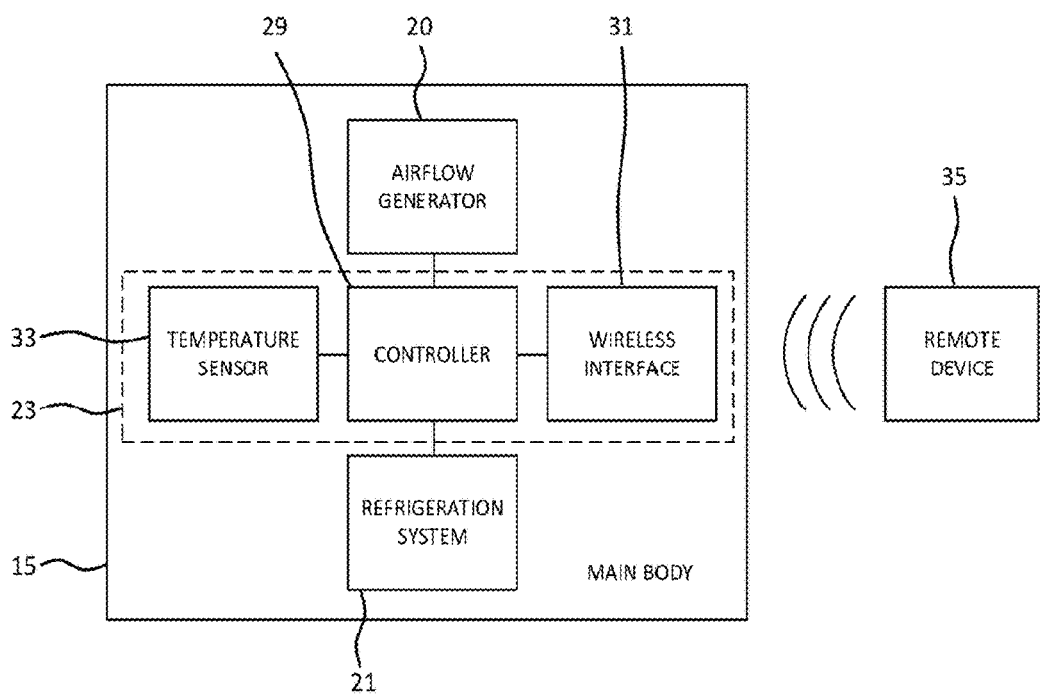
FIG. 4 is a block diagram of components of the fan assembly.

Turning now to FIG. 4, the control unit 23 comprises a controller 29, a wireless interface 31, and a temperature sensor 33.

The controller 29 is responsible for controlling the operation of the fan assembly 10. The controller 29 is connected to the airflow generator 20, the refrigeration system 21, the wireless interface 31, and the temperature sensor 33. The controller 29 controls the airflow generator 20 and the refrigeration system 21 in response to data received from the wireless interface 31 and the temperature sensor 33. For example, the controller 29 may power on and off the airflow generator 20, control the speed of the airflow generator 20, and/or control the operating state of the refrigeration system 21.

The wireless interface 31 receives command data from one or more remote devices 35. In examples, the remote devices 35 may comprise a user-operated device. For example, the remote devices 35 may comprise a dedicated remote control or a mobile device, such as a phone or tablet, running a suitable application. A user may then use the remote device to control remotely the operation of the fan assembly 10. For example, the device may be used to power on and off the fan assembly 10, control the speed and/or the direction of the airflow, as well as schedule operation of the fan assembly 10. In other examples, the remote devices 35 may comprise a room thermostat or other remote temperature sensor, which transmits temperature data to the wireless interface 31. The controller 29 may then operate the fan assembly 10 in response to changes in the temperature data. For example, the controller 29 may control the airflow generator 20 and/or the refrigeration system 21 such that a temperature within a room is maintained at a target temperature.

The temperature sensor 33 forming part of the control unit 23 monitors a temperature of the refrigeration system 21, discussed in more detail below, and outputs temperature data to the controller 29.

The control unit 23 may additionally comprise a user interface for controlling the operation of the fan assembly 10. For example, the user interface may comprise buttons, dials, a touchscreen or the like for powering on and off the airflow generator 20, as well as controlling the speed and/or direction of the airflow.

The fan assembly 10 is operable in one of a cooling mode and a regeneration mode.

In cooling mode, the controller 29 operates the refrigeration system 21 in the first state and operates the airflow generator 20 at a first speed. Thereby an airflow is drawn in through the inlet 25, through the filter assemblies 18,19, over the heat exchanger 49 of the refrigeration system 21 and emitted from the outlet 13 of the nozzle 11. As the refrigeration system 21 is operating in the first state, the airflow is cooled by the refrigeration system 21 and thus a cooled airflow is emitted from the nozzle 11. The speed of the airflow generator 20 in the cooling mode may be defined by the command data received by the controller 29. In this way, the speed of the airflow generator 20 may be controlled to achieve different cooling rates or profiles.

In regeneration mode, the controller 29 operates the refrigeration system 21 in the second state and operates the airflow generator 20 at a second speed. Again, an airflow is drawn in through the inlet 25, though the filter assemblies 18,19, over the heat exchanger 49 of the refrigeration system 21 and is emitted from the outlet 13 of the nozzle 11. As the refrigeration system 21 is operating in the second state, the airflow is warmed by the refrigeration system 21 and thus a warmed airflow is emitted from the nozzle 11. Regeneration mode is used to expel heat that was stored by the refrigeration system 21 during cooling mode. The speed of the airflow generator 20 in regeneration mode may be lower than that used in cooling mode, i.e. the second speed may be lower than the first speed. For example, the airflow generator 20 may operate at a relatively low or trickle speed in regeneration mode. As a result, the noise generated by the fan assembly 10 when operating in regeneration mode may be reduced.

The fan assembly 10 is intended to be used primarily to provide a cooled airflow. This cooled airflow may be used, for example, to cool a room. To achieve this, the fan assembly 10 operates in cooling mode. In cooling mode, as described above, the airflow is drawn over the heat exchanger 49, which extracts heat from the airflow, and the now cooled airflow is emitted from the nozzle 11. The extracted heat is stored within the refrigeration system 21. Cooling then continues until either cooling is no longer required (e.g. the fan assembly is turned off, or the temperature within the room has reached a target setpoint), or the maximum heat storage capacity of the refrigeration system 21 has been reached. As described below in further detail, the heat stored by the refrigeration system 21 may be sensed by the temperature data output by the temperature sensor 33, and the controller 29 may determine that the maximum heat storage capacity of the refrigeration system 21 has been reached when the temperature exceeds an upper threshold.

During periods when cooling is not required, or when the maximum heat storage capacity of the refrigeration system 21 has been reached, the fan assembly 10 may operate in regeneration mode. In regeneration mode, the fan assembly expels the heat that was stored during cooling. As a result, the fan assembly 10 is restored to a state in which cooling is possible. Regeneration mode may continue until either cooling is required or the full heat storage capacity of the refrigeration system 21 has been restored. As described below, the controller 29 may determine that the heat storage capacity of the refrigeration system 21 has been fully restored when the temperature drops below a lower threshold.

As a warmed airflow is emitted from the fan assembly 10 when operating in regeneration mode, regeneration may occur at times when the room is unoccupied (or unlikely to be occupied) or at times when warming is actually desirable. For example, the fan assembly be scheduled to operate in cooling mode during the day, and regeneration mode during the night. In a further example, geofencing may be employed, and the fan assembly 10 may operate in regeneration mode when a user is no longer present in the room or building in which the fan assembly 10 is located.

Figure 5:
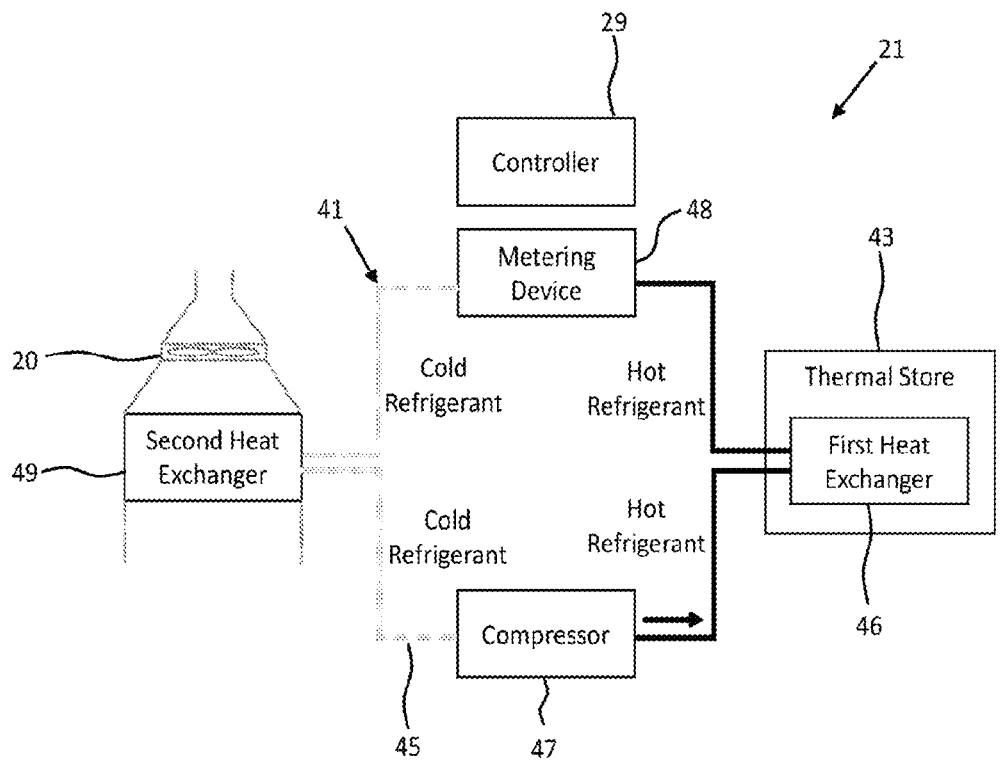
FIG. 5 is a schematic of a refrigeration system of the fan assembly in a first state.
Figure 6:
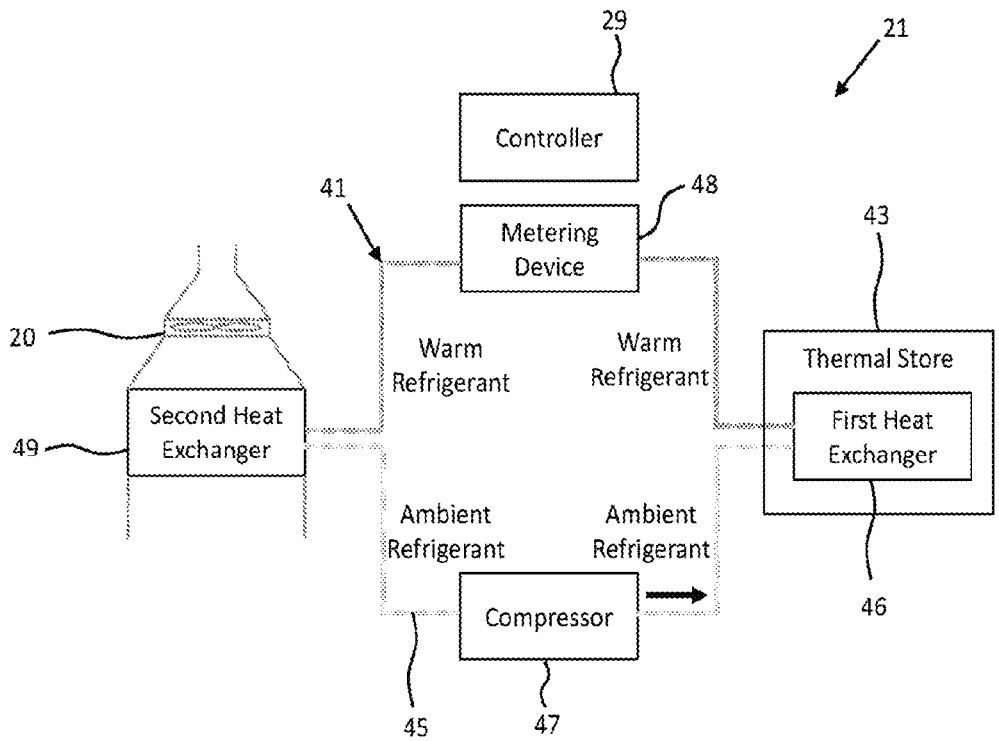
FIG. 6 is a schematic of the refrigeration system in a second state.

Turning now to FIGS. 5 and 6, reference will now be made to the composition and operation of the refrigeration system 21. The refrigeration system 21 comprises a circuit 41 and a thermal store 43.

The circuit 41 comprises a series of pipes 45, a first heat exchanger 46, a compressor 47, a metering device 48, and a second heat exchanger 49.

The series of pipes 45 connect the compressor 47 to the first heat exchanger 46, the first heat exchanger 46 to the metering device 48, the metering device 48 to the second heat exchanger 49, and the second heat exchanger 49 to the compressor 47 such that a refrigerant can circulate around the circuit 41.

The first heat exchanger 46 is downstream of the compressor 47 and upstream of the metering device 48, and exchanges heat between the refrigerant and the thermal store 43. The second heat exchanger 49 is located downstream of the metering device 48 and upstream of the compressor 47, and exchanges heat between the refrigerant and the airflow moving through the fan assembly 10.

The compressor 47 drives the refrigerant around the circuit 41 in a direction indicated by the arrow in FIGS. 5 and 6. The refrigerant circulates from the compressor 47 to the first heat exchanger 46, from the first heat exchanger 46 to the metering device 48, from the metering device 48 to the second heat exchanger 49, and from the second heat exchanger 49 to the compressor 47. Depending on the state of operation, discussed subsequently, the compressor 47 may additionally compress the refrigerant.

The metering device 48 is operable in a restricted state and an unrestricted state. In the restricted state, the refrigerant flowing through the metering device 48 expands and the pressure and temperature of the refrigerant decreases. In the unrestricted state, the refrigerant flowing through the metering device 48 does not expand and the pressure and temperature of the refrigerant is unchanged. In this example, the metering device 48 comprises a variable expansion valve. In the restricted state, the variable expansion valve has a first restriction, and in the unrestricted state, the variable expansion valve has a second, less restrictive restriction. In other examples, the metering device 48 may comprise a capillary tube and the refrigeration system 21 may comprise a bypass valve for bypassing the metering device 48 in the second state.

The thermal store 43 stores thermal energy for transfer to and from the refrigerant in order to heat and cool the refrigerant. In this particular example, the thermal store 43 comprises a phase change material. This then has the benefit that the thermal store 43 can take advantage of the latent heat capacity of the phase change material to store more thermal energy for a given change in temperature. As a result, the refrigeration system 21 may provide cooling at the second heat exchanger 49 for a longer period. Nevertheless, the refrigeration system 21 may operate with a thermal store 43 that does not comprise a phase change material. The phase change material may have a melting point greater than the ambient temperature of the room. This then has the advantage that heat stored by the thermal store may be expelled to the room in regeneration mode. A relatively high melting point has the advantage of increasing the rate at which heat is expelled in regeneration mode, and thus decreasing the time required to regenerate the thermal store. A relatively low melting point, on the other hand, has the advantage of improving the efficiency of the refrigeration system in cooling mode. A relatively good balance between these two competing factors may be achieved with a phase change material having a melting point of between 30° C. and 80° C. In some examples, the phase change material may comprise an organic wax or inorganic salt hydrate In addition to the functions described above, the controller 29 controls the compressor 47 and the metering device 48. For example, the controller 29 may power on and off the compressor 47, as well as control the state of the metering device 48 and the speed of the compressor 47 in response to control data received from the wireless interface 31 and the temperature sensor 33.

As discussed above, the refrigeration system 21 is operable in a first state and a second state.

In the first operating state, shown in FIG. 5, the controller 29 moves the metering device 48 to the restricted state. As a consequence of the metering device 48 being in the restricted state, the pressure and temperature of the refrigerant flowing though the metering device 48 decreases. In this particular example, the refrigerant remains in the liquid state, but could conceivably undergo a phase transition from a liquid state to a liquid-vapour state. The refrigerant flowing through the second heat exchanger 49 is at a lower temperature than the airflow moving over the second heat exchanger 49. Consequently, the second heat exchanger 49 acts as an evaporator to cool the airflow, and heat and vaporise the refrigerant. The refrigerant therefore undergoes a phase transition from a liquid state to a vapour state. The refrigerant then flows from the second heat exchanger 49 to the compressor 47, whereupon the refrigerant is compressed to increase the pressure, and thus the temperature, of the refrigerant. The refrigerant then flows through the first heat exchanger 46, which exchanges heat between the refrigerant and the thermal store 43. The refrigerant flowing through the first heat exchanger 46 is at a higher temperature than the thermal store 43. As a result, the first heat exchanger 46 acts as a condenser to heat the thermal store 43, and cool and condense the refrigerant. The refrigerant therefore undergoes a phase transition from a vapour state to a liquid state. The refrigerant then flows to the metering device 48, and the cycle is repeated.

In the second operating state, shown in FIG. 6, the controller 29 moves the metering device 48 to the unrestricted state. As a consequence of the metering device 48 being in the unrestricted state, the pressure and temperature of the refrigerant flowing though the metering device 48 is unchanged. In this particular example, the refrigerant is in a vapour state, but could conceivably be in a liquid-vapour or a liquid state. Refrigerant flowing through the second heat exchanger 49 is at a higher temperature than the airflow moving over the second heat exchanger 49. Consequently, the airflow is heated, and the refrigerant is cooled. In this particular example, the refrigerant is not cooled below its boiling point and thus the refrigerant does not condense or undergo a phase change. The refrigerant then flows from the second heat exchanger 49 to the compressor 47. Owing to the unrestricted state of the metering device 48, the compressor 47 does not compress the refrigerant. The refrigerant then flows through the first heat exchanger 46, which exchanges heat between the refrigerant and the thermal store 43. The refrigerant flowing through the first heat exchanger 46 is at a lower temperate than the thermal store 43. As a result, the thermal store 43 is cooled, and the refrigerant is heated. In this particular example, the refrigerant flowing through the first heat exchanger 46 is in a vapour state and does not therefore undergo a phase transition. The refrigerant then flows to the metering device 48, and the cycle is repeated.

As noted above, the fan assembly 10 is operable in one of two modes: cooling and regeneration. When operating in cooling mode, the controller 29 configures the refrigeration system in the first state. The controller 29 then monitors the temperature of the thermal store 43 (via the temperature sensor 33). In the event that the temperature of the thermal store 43 exceeds an upper threshold, the controller 29 powers off the airflow generator 20 and the refrigeration system 21 (i.e. the compressor 47), or alternatively switches from cooling mode to regeneration mode. The upper threshold may represent a temperature above which the refrigeration system 21 is no longer able to effectively or efficiently cool the airflow. In this regard, the efficiency of the refrigeration system 21 decreases as the difference in the temperatures of the two heat exchangers 46,49 increases. Alternatively, the upper threshold may represent a temperature above which the volume expansion of the thermal store 43 becomes excessive, or the temperature of the thermal store 43 becomes excessively hot, which may present a safety concern or may lead to adverse changes in the physical and/or chemical properties of the thermal store 43.

Additionally or alternatively, the upper threshold may represent a temperature above which the pressure of the refrigerant becomes excessive.

When operating in regeneration mode, the controller 29 configures the refrigeration system in the second state. The controller 29 again monitors the temperature of the thermal store 43. In the event that the temperature drops below the lower threshold, the controller 29 powers off the airflow generator 20 and the refrigeration system 21, or alternatively switches from regeneration mode to cooling mode. As noted, the efficiency of the refrigeration system 21 increases as the difference in the temperatures of the heat exchangers 46,49 decreases. The lower threshold may therefore represent a temperature below which the refrigeration system 21 is again able to effectively or efficiently cool the airflow. Where the thermal store 43 comprises a phase change material, the upper and lower thresholds may be respectively greater and lower than the melting point of the phase change material. For example, where the phase change material has a melting point of 46° C., the upper threshold may be 48° C. and the lower threshold may be 44° C.

Figure 7:
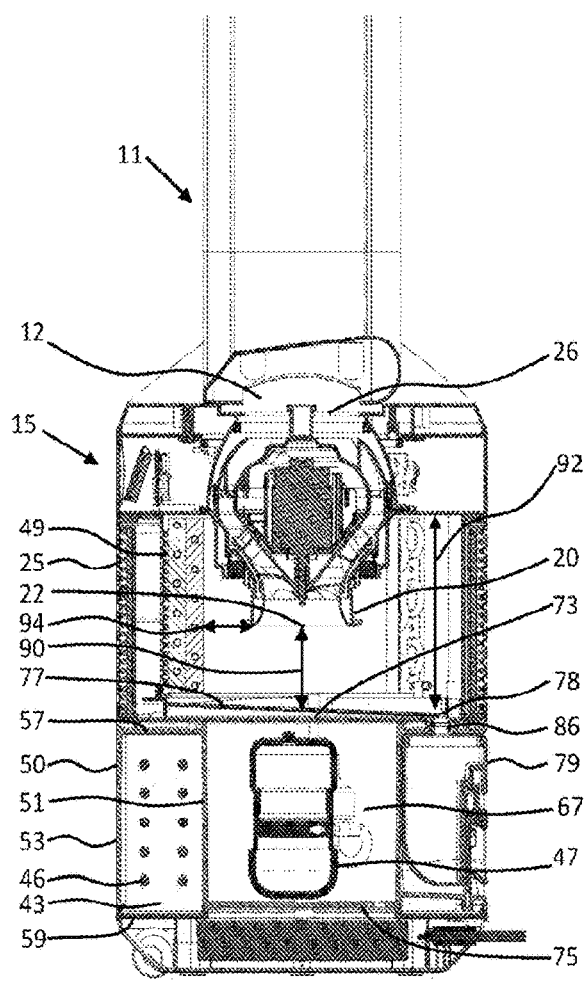
FIG. 7 is a vertical section through part of the fan assembly.
Figure 8:
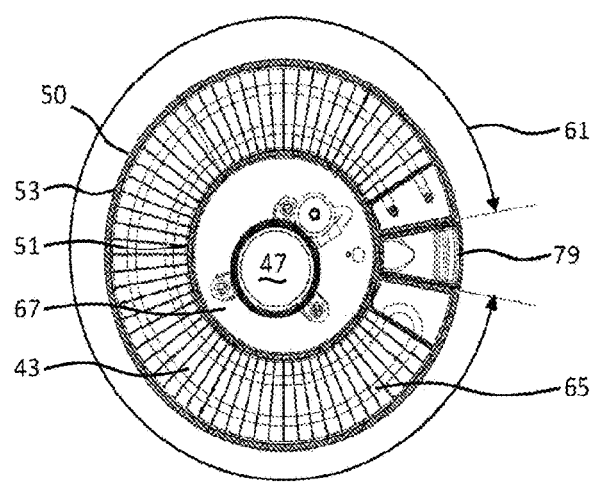
FIG. 8 is a horizontal section through the fan assembly.

Turning now to FIGS. 7 and 8, reference will now be made to how the various components of the fan assembly 10 are packaged.

The main body 15 comprises a tank 50 that contains the thermal store 43. The tank 50 is generally cylindrical in shape, but comprises a gap such that the tank 50 (and thus the thermal store 43) is c-shaped in cross-section. The tank 50 comprises an inner wall 51 and an outer wall 53 that are arranged concentrically. The inner wall 51 subtends a central angle of 360°, whilst the outer wall 53 subtends a central angle of 340°. Radial walls then extend between the ends of the outer wall 53 and the inner wall 51. The tank 50 is enclosed at the top and bottom by top and bottom walls 57,59.

The tank 50 partly defines a chamber 67 within which the compressor 47 is located. The compressor 47 is therefore partially surrounded by the thermal store 43. In the example of FIGS. 7 and 8, the thermal store 43 may be regarded as a sleeve that surrounds a major portion of the compressor 47. This then has two benefits. Firstly, a relatively large thermal store 43 may be packaged within the main body 15 in a relatively compact manner. Secondly, the thermal store 43 may absorb noise generated by the compressor 47.

The first heat exchanger 46 is embedded within the thermal store 43 and comprises piping 65 through which the refrigerant flows. Owing to spacing required for turns in the piping 65, the thermal store 43 does not completely surround the compressor 47 but instead subtends a central angle of about 340° about the compressor 47. Conceivably, the thermal store 43 could completely surround the compressor 47. However, this would then result in a portion of the thermal store 43 that is not in direct thermal contact with the first heat exchanger 46. Although this may help further absorb noise from the compressor 47, the additional material may not necessarily increase the heat storage capacity of the thermal store 43. By omitting this additional material, the cost and weight of the fan assembly 10 may be reduced. Moreover, advantage may be taken of the gap in the thermal store 43 by using it to locate another component of the fan assembly 10. In this example, the recess 80 extends into the gap such that the bottle 79 of the condensation collector 77,79 is located in the gap. Furthermore, in this example, the conditioned airflow is emitted from the front of the fan assembly 10 whereas the gap is located towards the rear of the fan assembly 10. As a result, any noise that may escape through the gap may be directed away from a user of the fan assembly 10.

The thermal store 43 has a height at least equal to that of the compressor 47. As a result, noise emitted in a sideways direction from the compressor 47 may be absorbed by the thermal store 43. Furthermore, the thermal store 43 has a thickness of around 60 mm measured radially from a longitudinal axis of the thermal store 43. A relatively thick thermal store 43 has the advantage of absorbing more of the noise generated by the compressor 47, as well as increasing the thermal mass of the thermal store 43. A relatively thin thermal store 43, on the other hand, has the advantage of reducing the cost and weight of the fan assembly 10, which in turn may improve the portability of the fan assembly 10. A thermal store having a thickness of between 20 mm and 150 mm provides a good balance between these competing factors.

The thermal store 43 comprises a high-density medium (e.g. a solid, liquid, or solid-liquid phase change material). As a result, relatively good sound absorption may be achieved at the lower frequencies typically generated by the compressor 47.

The first heat exchanger 46 is embedded within the thermal store 43. Consequently, the first heat exchanger 46 may be said to be cylindrical or annular in shape. By providing a thermal store 43 and/or a heat exchanger 46 that is cylindrical in shape, a relatively compact arrangement may be achieved. In particular, the thermal store 43 and/or the first heat exchanger 46 may surround one or more other components of the fan assembly 10, such as the compressor 47 in this instance.

The compressor 47 is located towards a base of the main body 15. The compressor 47 is a relatively heavy component of the fan assembly 10 and thus locating the compressor 47 towards the base of the main body 15 provides a lower centre of gravity which may improve the stability of the fan assembly 10. The compressor 47 is located within the chamber 67, bounded by the inner wall 51 of the tank 50. The top and bottom of the chamber 47 are then bounded by a first plate 73 and a second plate 75. The first plate 73 has one or more openings through which pipes 45 of the circuit 41 pass into and out of the chamber 67. By providing plates 73,75 directly above and below the compressor 47, noise emitted from the compressor 47 in the vertical directions may be absorbed.

The metering device 48 is located within the chamber 67. Thereby, noise generated by the metering device 48 (e.g. due to movement of the refrigerant through the metering device 48) may be absorbed by the thermal store 43 and plates 73,75. However, it is conceivable that the metering device 48 may be located outside of the chamber 67.

The airflow generator 20 is located above the compressor 47, towards the top of the main body 15. The airflow generator 20 is located centrally along a longitudinal axis of the main body 15.

The second heat exchanger 49 is cylindrical or annular in shape and is positioned vertically above the thermal store 43 and the first heat exchanger 46. In this example, the first heat exchanger 46 and the second heat exchangers 49 are concentric. The second heat exchanger 49 then surrounds a lower part of the airflow generator 20. By stacking the heat exchangers 46,49 vertically in this way, and by locating components of the fan assembly 10 (e.g. airflow generator 20 and compressor 47) within the interior space defined by the heat exchangers 46,49, a relatively compact arrangement may be achieved. In particular, the footprint of the fan assembly 10 may be reduced.

The second heat exchanger 49 surrounds a major portion of the airflow generator 20. In this example, the second heat exchanger 49 subtends a central angle of roughly 300° about the airflow generator 20. In other examples, the second heat exchanger 49 may subtend a larger or smaller central angle. As the central angle decreases, however, the area of the second heat exchanger decreases. Accordingly, the second heat exchanger 49 may subtend a central angle of at least 270°. As a result, the height and footprint of the fan assembly 10 may be reduced whilst achieving a good area for the second heat exchanger 49.

The tray 77 of the condensation collector 77,79 is spaced from, and extends broadly parallel to, an inlet 22 of the airflow generator 20 such that the tray 77 may be considered to face the inlet 22 of the airflow generator 20. An axial gap 90 (i.e. measured in a direction normal to the inlet 22 or parallel to the rotational axis of the airflow generator 20) exists between the inlet 22 of the airflow generator 20 and the tray 77. In this example, the tray 77 has a sloped upper surface, so the axial gap 90 is measured between a centre of the inlet 22 and the tray 77. The axial gap 90 has a value of 35 mm and the inlet 22 of the airflow generator 20 has a diameter of 68 mm. Therefore a ratio of the axial gap 90 to the diameter of the inlet 22 is around 1:1.9. The applicant has observed that, if this ratio is too low, say below 1:2.3, the airflow between the tray 77 and the inlet 22 of the airflow generator 20 may become pinched, leading to an increase in the velocity and distortion of the airflow. This increase in velocity and distortion results in several negative effects. Firstly, the noise generated by the airflow increases, which may be undesirable for a user of the fan assembly 10. Secondly, the airflow over the second heat exchanger 49 may become non-uniform. Specifically, the flow rate of the airflow over the lower part of the second heat exchanger 49 may be higher, whilst the flow rate of the airflow over the upper part of the second heat exchanger 49 may be lower. As a result, the performance of the second heat exchanger 49 decreases. By having a relatively high ratio, i.e. one that is at least 1:2.3, the uniformity of the airflow over the second heat exchanger 49 may be improved, which may improve the performance of the second heat exchanger 49. Additionally, the noise produced by the airflow generator 20 may be reduced. As this ratio increases, however, the overall height of the fan assembly 10 is likely to increase. Accordingly, the ratio of the axial gap to the diameter of the inlet may be between 1:2.3 and 1:1, and more particularly between 1:2 and 1:1.1. Moreover, the axial gap 90 itself may be between 30 mm and 70 mm. This then provides a relatively good balance between the competing needs to reduce the height of the fan assembly 10 whilst also preventing pinching of the airflow.

The second heat exchanger 49 has a height 92 of 115 mm. As a result, a ratio of the axial gap 90 to the height 92 of the second heat exchanger 49 is around 1:3.3. The applicant has observed that, if this ratio is too low, say below 1:4, the airflow over the second heat exchanger 49 may be non-uniform. Specifically, the flow rate of the airflow over the lower part of the second heat exchanger 49 may be higher, whilst the flow rate over the upper part of the second heat exchanger 49 may be lower. As this ratio increases, however, the overall height of the fan assembly 10 is likely to increase. A ratio of between 1:4 and 1:3, and more particularly between 1:3.8 and 1:3.1, may provide a good balance between the competing needs to reduce the height of the fan assembly 10, whilst also providing uniform airflow over the second heat exchanger 49.

The fan assembly 10 additionally comprises a radial gap 94 between the airflow generator 20 and the second heat exchanger 49 of 30 mm. Specifically, the radial gap 94 is in a direction parallel to the inlet 22 of the air flow generator 20 and is measured in a plane of the inlet 22 of the airflow generator 20. The fan assembly 10 therefore has a ratio of the radial gap 94 to the height 92 of the second heat exchanger 49 of around 1:3.3. For relatively low ratios, the applicant has observed that the airflow moving over the second heat exchanger 49 may become non-uniform, which may result in a reduction in the performance of the second heat exchanger 49. However, relatively high ratios, on the other hand, are likely to increase the footprint of the fan assembly 10. Having a ratio of between 1:5 and 1:3 may provide a good balance between the competing needs of improving the uniformity of the airflow over the second heat exchanger 49, and providing a compact arrangement. Additionally, having a radial gap 94 of between 20 mm and 50 mm may also provide a good balance between the competing needs in a fan assembly sufficiently large to provide a useful airflow rate for use in a domestic setting.

The second heat exchanger 49 is located at approximately the same height as the inlet 25 in the housing 17. Consequently, the apertures in the housing 17 may be said to surround the second heat exchanger 49. As a result of this arrangement, a relatively straight, radial path may be taken by the airflow when moving from the inlet 25 to the airflow generator 20. By providing a relatively straight, less contorted path, pressure losses may be reduced and thus a higher flow rate may be achieved for the airflow.

The tray 77 of the condensation collector 77,79 is located beneath the second heat exchanger 49 and above the first heat exchanger 46 (i.e. between the first 46 and second 49 heat exchangers). Locating the tray 77 between the two heat exchangers makes better use of the available space within the fan assembly 10 and thereby may provide a more compact arrangement.

With the fan assembly 10 described above, the thermal store 43 performs two important functions. Firstly, the thermal store 43 stores heat transferred from the first heat exchanger 46, thereby obviating the requirement to expel the heat immediately into the surrounding environment. Secondly, the thermal store 43 absorbs noise generated by the compressor 47. Acoustic emissions from the fan assembly 10 may therefore be reduced without the requirement for separate noise-absorbing materials, such as acoustic foams.

In the example described above, the thermal store 43 subtends a central angle 61 of 340°. However, the thermal store 43 may subtend a smaller angle, or indeed a larger angle. For example, the thermal store 380 may subtend an angle of, say, at least 180°. As a result, noise generated by the compressor 47 may be absorbed around at least one half of the fan assembly 10. The fan assembly 10 may then be sited adjacent a wall within a room and oriented such that the portion of the compressor 47 covered by the thermal store 43 is directed towards the centre of the room, whereas the uncovered portion may be directed towards the wall. Significant acoustic improvements may therefore be achieved without necessarily requiring the thermal store 43 to surround wholly the compressor 47.

In the above example the first and second plates 73,75 cover the top and bottom of the chamber 67. However, conceivably the one or both of the plates 73,75 may be omitted. Moreover, the thermal store 43 may be arranged to cover at least part of the top and/or bottom of the chamber 67. This may then further reduce the emission of noise from the fan assembly 10.

In the above example, the fan assembly is used to cool a room. The phase change material is then warmed and melts in cooling mode, and cools and solidifies in regeneration mode. In an alternative example, the fan assembly may be used to heat the room. The phase change material is then cooled and solidifies in a heating mode, and warmed and melts in regeneration mode. In this alternative example, the phase change material may have a melting point below the ambient temperature of the room, e.g. a melting point of 0° C., such that the phase change material transitions from a liquid to a solid state in heating mode, and vice versa in regeneration mode. Again, in so doing, advantage may be taken of the latent heat capacity of the phase change material to store and subsequently release relatively large amounts of heat for a given temperature range.

Figure 9:
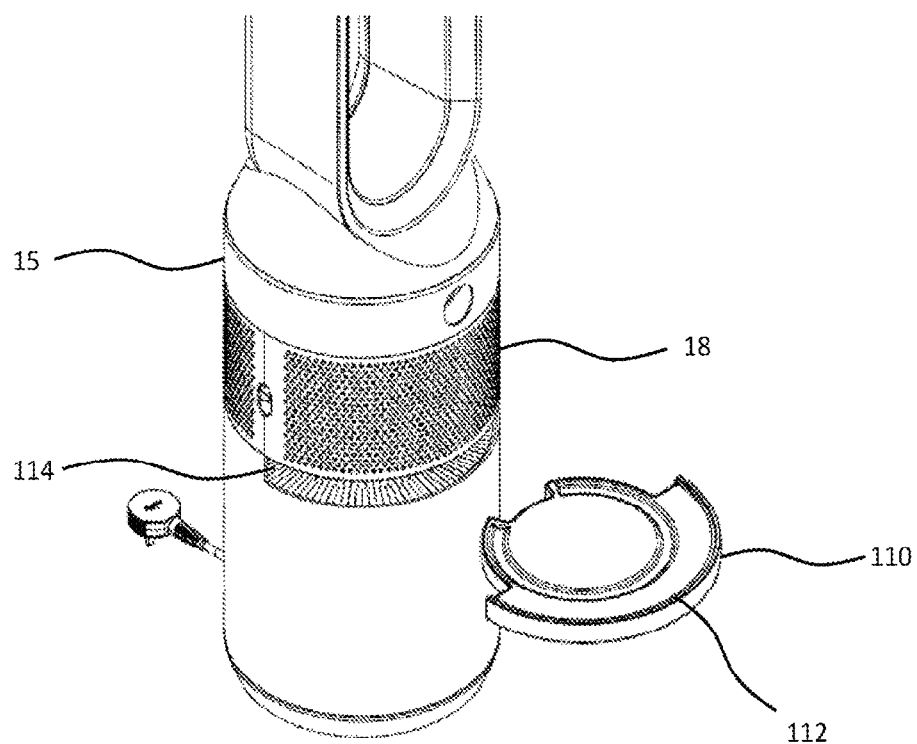
FIG. 9 is a perspective view of an alternative fan assembly with an alternative condensation collector visible.

In the example described above, the user must first remove one of the filter assemblies in order to access and remove the tray. FIG. 9 illustrates an alternative example in which the tray may be removed without having to first remove a filter assembly. The condensation collector of FIG. 9 comprises a tray 110 which comprises a further seal 112 which extends around an outside of the tray 110 and is for sealing the tray 110 against the main body 15. The tray 110 is located within a slot 114 which extends beneath the filter assemblies 18,19 and second heat exchanger 49 and has an opening accessible from the outside of the main body 15. As a result, the tray 110 is removable from the main body 15 independently of the filter assemblies 18,19. Therefore, by providing an independently removable tray 110, the user is not required to unnecessarily remove the filter assemblies 18,19 to remove the tray 110. This may improve the ease of use of the fan assembly 10. Additionally, the condensation collector does not comprise a bottle. Instead, the bottle is omitted and the tray 110 of FIG. 9 is deeper than the tray 77 of FIG. 2. As a result, the tray 110 is capable of capturing a larger amount of condensate. Omitting the bottle may provide a simpler arrangement for the condensation collector.

Although described above in connection with a fan assembly, the refrigeration system and/or the particular packaging of the components may be used in other products, such as a ducted portable air conditioning device or a dehumidifier.

In the above examples, the thermal store surrounds the compressor of the refrigeration system of the product. In other examples, the thermal store may surround an alternative component of the product. For example, where the product comprises an airflow generator or other turbomachine, the thermal store may surround the turbomachine. Accordingly, in a more general sense, the product may be said to comprise a component and a thermal store, and the thermal store may be said to surround at least part of the component to absorb noise generated by the component.

In the above examples, the airflow generator 20 is operable to generate an airflow through the fan assembly 10 having a maximum flow rate of 25 L/s. In other examples, the airflow generated by the air generator 20 may have a different maximum flow rate. However, by having an airflow of at least 20 L/s, the fan assembly 10 may provide effective cooling of a user and/or heating of a relatively large volume, such as a room.

The above examples are to be understood as illustrative examples of the invention. Furthermore, equivalents and modifications not described above may also be employed without departing from the scope of the invention, which is defined in the accompanying claims.

The invention claimed is:

1. A fan assembly comprising:
a main body;
a refrigeration system comprising a first heat exchanger and a second heat exchanger, the second heat exchanger being located above the first heat exchanger;
an airflow generator for generating an airflow over the second heat exchanger;
a filter assembly for filtering the airflow, the filter assembly surrounding the second heat exchanger and comprising a seal for sealing the filter assembly against the main body; and
a condensation collector for collecting condensate that forms on the second heat exchanger, wherein the condensation collector comprises a tray located between the first heat exchanger and the second heat exchanger and downstream of the seal, the tray being removable from the main body by first removing at least a part of the filter assembly from the main body, wherein the first heat exchanger is an evaporator and the second heat exchanger is a condenser.

2. The fan assembly as claimed in claim 1, wherein the tray is removable from the fan assembly.

3. The fan assembly as claimed in claim 1, wherein the condensation collector further comprises a bottle, and the tray comprises a drain through which condensate collected by the tray drains into the bottle.

4. The fan assembly as claimed in claim 3, wherein the tray and the bottle are each removable from the fan assembly.

5. The fan assembly as claimed in claim 3, wherein the first heat exchanger is annular in shape and comprises a gap within which the bottle is located.

6. The fan assembly as claimed in claim 1, wherein the second heat exchanger is annular in shape.

7. The fan assembly as claimed in claim 1, wherein:
the tray comprises a second seal for sealing the tray against the main body; and
the tray is removable from the main body independently of the filter assembly.

8. The fan assembly as claimed in claim 1, wherein the condensation collector has a capacity of greater than 200 ml.

9. The fan assembly as claimed in claim 1, wherein the second heat exchanger surrounds a major portion of the airflow generator.

10. The fan assembly as claimed in claim 1, wherein the fan assembly comprises a thermal store, and the first heat exchanger is configured to exchange heat with the thermal store.

11. The fan assembly as claimed in claim 1, wherein the first heat exchanger and second heat exchanger are cylindrical in shape.

12. The fan assembly as claimed in claim 1, wherein the refrigeration system comprises a compressor, and the first heat exchanger surrounds a major portion of the compressor.

13. The fan assembly as claimed in claim 1, wherein the fan assembly comprises a compressor for moving a refrigerant between the first heat exchanger and the second heat exchanger, and a metering device for reducing a pressure of the refrigerant.

14. A fan assembly comprising:
a main body;
a refrigeration system comprising a first heat exchanger and a second heat exchanger;
an airflow generator for generating an airflow over the second heat exchanger;
a filter assembly for filtering the airflow, the filter assembly surrounding the second heat exchanger and comprising a seal for sealing the filter assembly against the main body; and
a condensation collector for collecting condensate that forms on the second heat exchanger,
wherein the condensation collector comprises a bottle, and the first heat exchanger is annular in shape and comprises a gap within which the bottle is located, wherein the condensation collector comprises a tray located between the first heat exchanger and the second heat exchanger and downstream of the seal, the tray being removable from the main body by first removing at least a part of the filter assembly from the main body.

15. The fan assembly as claimed in claim 14, wherein the bottle is removable from the fan assembly.

16. The fan assembly as claimed in claim 14, wherein the second heat exchanger is located above the first heat exchanger.

17. The fan assembly as claimed in claim 14, wherein the condensation collector further comprises a tray located beneath the second heat exchanger, and the tray comprises a drain through which condensate collected by the tray drains into the bottle.

18. The fan assembly as claimed in claim 17, wherein the tray and the bottle are each removable from the fan assembly.

19. The fan assembly as claimed in claim 14, wherein the first heat exchanger has a c-shaped body.

* * * * *